United States Patent
Laidlaw et al.

(10) Patent No.: US 8,291,228 B2
(45) Date of Patent: *Oct. 16, 2012

(54) METHOD AND SYSTEM FOR MODULAR AUTHENTICATION AND SESSION MANAGEMENT

(75) Inventors: Robert Laidlaw, Tempe, AZ (US); Coby Royer, St. Louis, MO (US); Rick D. Johnson, Phoenix, AZ (US); Scott More, Maple Grove, MN (US)

(73) Assignee: American Express Travel Related Services Company, Inc., New York, NY (US)

(*) Notice: Subject to any disclaimer, the term of this patent is extended or adjusted under 35 U.S.C. 154(b) by 0 days.

This patent is subject to a terminal disclaimer.

(21) Appl. No.: 12/255,448

(22) Filed: Oct. 21, 2008

(65) Prior Publication Data
US 2009/0044020 A1 Feb. 12, 2009

Related U.S. Application Data (63) Continuation of application No. 10/334,615, filed on Dec. 31, 2002, now Pat. No. 7,454,622.

(51) Int. Cl.
*G06F 21/00* (2006.01)

(52) U.S. Cl. ............ 713/176; 713/182; 713/185; 726/6; 726/7

(58) Field of Classification Search .................. None
See application file for complete search history.

(56) References Cited

U.S. PATENT DOCUMENTS

| | | | |
|---|---|---|---|
| 5,978,813 A | 11/1999 | Foltz et al. | |
| 6,006,331 A * | 12/1999 | Chu et al. | 726/5 |
| 6,182,226 B1 | 1/2001 | Reid et al. | |
| 6,490,624 B1 | 12/2002 | Sampson et al. | |
| 6,519,647 B1 | 2/2003 | Howard et al. | |
| 6,609,198 B1 * | 8/2003 | Wood et al. | 713/155 |
| 6,640,302 B1 | 10/2003 | Subramaniam et al. | |
| 6,668,322 B1 | 12/2003 | Wood et al. | |
| 6,674,695 B1 | 12/2003 | McFadden | |
| 6,839,843 B1 * | 1/2005 | Bacha et al. | 713/176 |
| 6,877,095 B1 | 4/2005 | Allen | |
| 6,892,307 B1 * | 5/2005 | Wood et al. | 726/8 |
| 6,898,711 B1 * | 5/2005 | Bauman et al. | 713/185 |
| 7,107,610 B2 * | 9/2006 | Lortz | 726/4 |
| 7,249,177 B1 * | 7/2007 | Miller | 709/225 |
| 7,318,235 B2 * | 1/2008 | Grawrock | 726/26 |
| 2002/0010651 A1 | 1/2002 | Cohn et al. | |
| 2002/0112186 A1 | 8/2002 | Ford et al. | |

(Continued)

OTHER PUBLICATIONS

Non-Final Office Action mailed Apr. 3, 2006 by Fikremariam A. Yalew.

(Continued)

*Primary Examiner* — Fikremariam A Yalew
(74) *Attorney, Agent, or Firm* — Snell & Wilmer L.L.P.

(57) ABSTRACT

Modular authentication and session management involves the use of discrete modules to perform specific tasks in a networked computing environment. There may be a separate authentication server that verifies the identity of the user and an authorization client that grants various levels of access to users. There may also be an authentication client that receives an initial request from a requesting application and forwards the request to the authentication server to verify the identity of the use. The authorization client may then be invoked to provide the necessary level of access. The use of discrete modules allows multiple business applications to use the same modules to perform user authentication tasks, thus alleviating the unnecessary multiplication of code.

17 Claims, 4 Drawing Sheets

U.S. PATENT DOCUMENTS

| | | |
|---|---|---|
| 2002/0129239 A1 | 9/2002 | Clark |
| 2003/0128101 A1 | 7/2003 | Long |
| 2003/0217264 A1 | 11/2003 | Martin et al. |
| 2004/0022390 A1 | 2/2004 | McDonald et al. |
| 2007/0162967 A1* | 7/2007 | de Jong et al. .................. 726/9 |
| 2007/0204044 A1* | 8/2007 | Rice et al. .................. 709/225 |

OTHER PUBLICATIONS

Final Office Action mailed Sep. 12, 2006 by Fikremariam A. Yalew.
Advisory Action mailed Dec. 19, 2006 by Fikremariam A. Yalew.
Non-Final Office Action mailed Mar. 6, 2007 by Fikremariam A. Yalew.
Final Office Action mailed Aug. 16, 2007 by Fikremariam A. Yalew.
Non-Final Office Action mailed Dec. 13, 2007 by Fikremariam A. Yalew.
Final Office Action mailed May 27, 2008 by Fikremariam A. Yalew.
Advisory Action mailed Aug. 11, 2008 by Fikremariam A. Yalew.
Notice of Allowance mailed Sep. 17, 2008 by Fikremariam A. Yalew.
PCT; International Preliminary Examination Report dated Nov. 22, 2004 in Application No. PCT/US2003/40430.
PCT; International Search Report dated Apr. 9, 2004 in Application No. PCT/US2003/40430.

* cited by examiner

METHOD AND SYSTEM FOR MODULAR AUTHENTICATION AND SESSION MANAGEMENT

CROSS-REFERENCE TO RELATED APPLICATIONS

This application is a continuation of and claims priority to, and the benefit of, U.S. Ser. No. 10/334,615, filed Dec. 31, 2002 and entitled "METHOD AND SYSTEM FOR MODULAR AUTHENTICATION AND SESSION MANAGEMENT", which is hereby incorporated by reference.

FIELD OF INVENTION

This invention is generally related to managing computer systems, and more particularly, to a method and system for modular authentication and session management.

BACKGROUND OF THE INVENTION

Systems that support interaction of one system with another system typically employ mechanisms to provide secure session management. Secure session management is a part of many transactional web applications currently in use. In general, interacting systems utilize an exchange of messages across a network in order to perform, for example, Internet shopping, on-line account management, etc. A "client system" usually issues a request for some secured action such as an on-line purchase and a "secure system" usually performs authentication services. Many different types of systems may engage in this type of interaction, including user applications such as a web browser, custom applications, etc.

Figure 1:
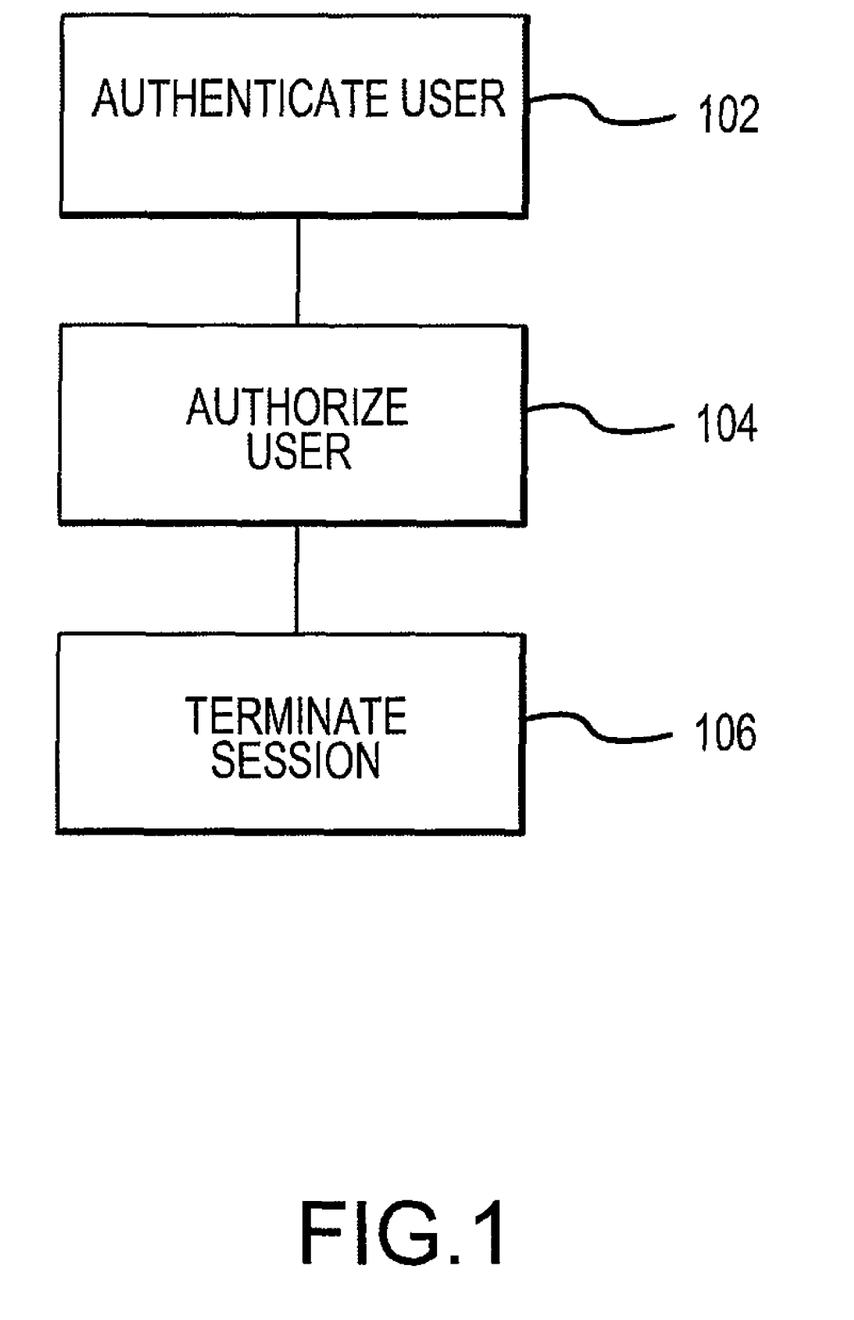
FIG. 1 is a flow chart illustrating the process of secure session management.

Secure session management may involve three phases, as illustrated in FIG. 1. In the first phase (step 102), the identity of the user is established through the presentment and validation of a set of credentials. This phase is sometimes called user authentication. Credentials may be an ID and password, an X.509 digital certificate, or any one of different types of information that derives from information that the user knows, or may be derived from various characteristics, such as biometric credentials. Once authentication occurs, the identity of the user is established and this identity may be used by the underlying application system to ensure that the user is handled in an appropriate way. Typically, this includes ensuring that the user has been authorization to perform requested activities, such as on-line purchases. This identity may also be used to ensure correct association with other information related to identity, such as valid financial instruments. Authentication results in the return of a session token from the authenticating system to the client system.

In a second phase of secure session management (step 104), the user is authorized such that the user is granted various levels of access to the various systems in question. The session token is presented with each request from a client system. When a client system wishes to send a message, the client system sends the session token, along with the message, to signify the authenticated identity of the requestor. The session token may be provided in lieu of authentication credentials because the receiving system may recognize the session token and use the session token to retrieve information about the previously authenticated user. The session token may also be used by the receiving system to compare information about the current user's session with previously stored information. Session information may include information about the original credentials presented plus session attributes such as duration, originating system or network, and more. Secure session management involves a system where the client submits the session token with each request, and the receiving system validates the token with each request.

The third phase of session management is session termination (step 106), which may occur programmatically, as by a request from the client system. It may also occur under the control of a security system, which may use duration, inactivity, or other characteristics to determine when a session should end. Upon termination of a session, if the client system subsequently attempts to present the session token that corresponds to the terminated session, an error will occur and the target of the request will reject the request.

Session management on the Internet typically occurs in one of several different ways. As Hypertext Transfer Protocol ("HTTP") is inherently stateless, it does not automatically afford a mechanism for session management. When a user requests a Uniform Resource Locator ("URL") from a web browser, there is no standard method for the receiving HTTP server to recognize the user identity or the fact that earlier requests originated from the same client. In order to overcome this deficiency, web applications may use cookies, mangled URLs, hidden form fields, or the like to identify a user. A cookie is a sequence of binary information that a web server may send to a client system, and which the client system sends back to the web server with each subsequent request, assuming the user employs a web browser client with cookie support present and enabled. A web application may inspect the value of cookies, and search for cookies that it previously issued in order to determine that a given web request is from a user who had previously been sent a cookie. Secure session management with cookies typically entails sending a session token in the form of a cookie when a user is authenticated, and then verifying the cookie whenever that user submits a subsequent request. Hidden form fields work in a similar way. The HTML content that is sent to a user contains the session token in a field that is not displayed by the browser. Instead, it is returned to the server when the page request is submitted. With URL mangling, the session token is encoded into the URL of a request.

The provision of session management and authentication capabilities is typically provided by replicating software code across each such business application that requires such functionality such that, for example, a brokerage unit and a banking unit of the same organization each have copies of the same code for authenticating users. However, replication of software code may not utilize resources in an efficient manner. Replication of code often utilizes redundant or disparate systems for the storage of authentication credentials and sessions. Replication of software code may also lead to inefficient and error-prone software, as code in one section of a program may be updated without updating the code in other sections. Replication of software code may also lead to undesirable user experiences. For example, users must remember a large number of distinct IDs and passwords, and login to each business system regardless of having earlier logged into other business systems of the same enterprise. Such instances may occur, for example, when a user has both a credit account and a brokerage account with the same provider. Administrative costs of such a solution may similarly be high, as simple tasks like changing addresses may necessitate widespread maintenance of a large number of systems for the user. It is desirable to have a system that alleviated the above-referenced potential problems.

SUMMARY OF THE INVENTION

A system of the present invention provides for a modular authentication means. An authentication server module is made available for various remote applications for use to facilitate authentication of users. An authentication client interfaces with an authentication server module in order to properly transmit the authentication information. An authorization client grants the user various levels of access based on the authentication information.

A method of the present invention operates in the following manner. A computing system received a request to perform a task from a user. The computing system forwards the request to a module that is configured to authenticate the user. The authentication module verifies the identity of the user, using one of a variety of different methods. The authentication module may supply a session token indicative of the verification. Thereafter, the predetermined permissions of the user are determined in one of a number of manners, such as accessing a database. After it is determined that the user has permission to perform the requested task, the requested task is then performed. The permissions may be stored in an access control list that contains data regarding the identity and privileges of the user.

BRIEF DESCRIPTION OF THE DRAWINGS

A more complete understanding of the present invention may be derived by referring to the detailed description and claims when considered in connection with the Figures, where like reference numbers refer to similar elements throughout the Figures, and:

DETAILED DESCRIPTION

The present invention may be described herein in terms of various functional components and various processing steps. It should be appreciated that such functional components may be realized by a variety of different hardware or structural components configured to perform the specified functions. For purposes of illustration only, exemplary embodiments of the present invention will be described herein. Further, it should be noted that, while various components may be suitably coupled or connected to other components, such connections and couplings may be realized by a direct connection between components, or by a connection through other components and devices.

For the sake of brevity, conventional data networking, application development and other functional aspects of the systems (and components of the individual operating components of the systems) may not be described in detail herein. Furthermore, the connecting lines shown in the various figures contained herein are intended to represent exemplary functional relationships and/or physical couplings between the various elements. It should be noted that many alternative or additional functional relationships or physical connections may be present in a practical electronic transaction system.

An embodiment of the present invention provides a method to perform session management using HTTP, which is typically employed by web applications. When the user authenticates at a login screen, the session token is placed into a cookie. When a subsequent request is received from the same client system, the session token is extracted from the cookie, and the token is obtained from a session table that is keyed by session token. In one embodiment, a single session token is retrieved, and a single session is maintained by a given modular authentication system. Other embodiment may utilize multiple sessions and session tokens. This table may then return the user login ID and a variety of other information. One such piece of information is an Access Control List ("ACL"), which is a list of permissions that identifies the activities for which the user is allowed in the current session. The authorization component can read the ACL and determine what activities the user is allowed to perform. For example, an ACL may specify that a specific user is able to edit entries in a specific, predetermined database, but may not add new entries to that database. Other information stored in the session table may include any subset of the following:

information regarding the last time the session was accessed a copy of user profile data current status of the user (e.g., expiration date of user's account, etc.)

authentication level that identifies the manner in which the user was authenticated. (For example ID and password is one level of authentication, while X.509 would be a different level)

expiration time of session information regarding the host that the user logged in from (e.g., the IP address)

security realm which captures a variety of security characteristics of the session public and private globally unique identification (GUID)

electronic signature to help verify token is valid process ID (PID) of requesting process parent process ID (PPID) of requesting process tokentype: user tokens, application tokens (e.g., daemon server tokens)

version (of struct stored in table)

max inactivity time allowed: (e.g., for web app, each may have a different inactivity timeout. This will be the maximum for the user period such that each site may handle their own constraints.)

The session table thus contains information that may be used in determining the authorization level of the user.

An exemplary session token of the present invention is a binary sequence of 128 bits of opaque data (also called a binary large object or "BLOB"). In one embodiment, this BLOB contains three elements: random data, a UNIX time stamp, and an incremental token ID. The BLOB is created by concatenating these three elements and then applying an encryption algorithm with a fixed key, such as DES, triple DES, AES, and the like. Random data may be generated by in a conventional fashion by a computing system. A UNIX time stamp is a number that encodes a date and time as defined by most UNIX operating system implementations (e.g., counting the number of seconds since Jan. 1, 1970). An incremental token ID may be an integer whose value increments by a predetermined amount every time the system generates a new ID. A session token may also be generated by various other means, now known or developed in the future, that may uniquely identify a session.

An embodiment of the present invention further addresses problems arising from software code replication by providing a modular solution that supports a single system, and unifies all user information, and optionally session information, across any number of desired applications in an enterprise. An embodiment of the present invention includes a modular solution that is based on software components that may run within the appropriate software applications and on the appropriate computer servers so as to avoid problems associated with software code replication (such as those detailed above). As such, an embodiment of the present invention comprises a number of distinct modules as described below, in conjunction with FIGS. 2A-2B.

Figure 2A:
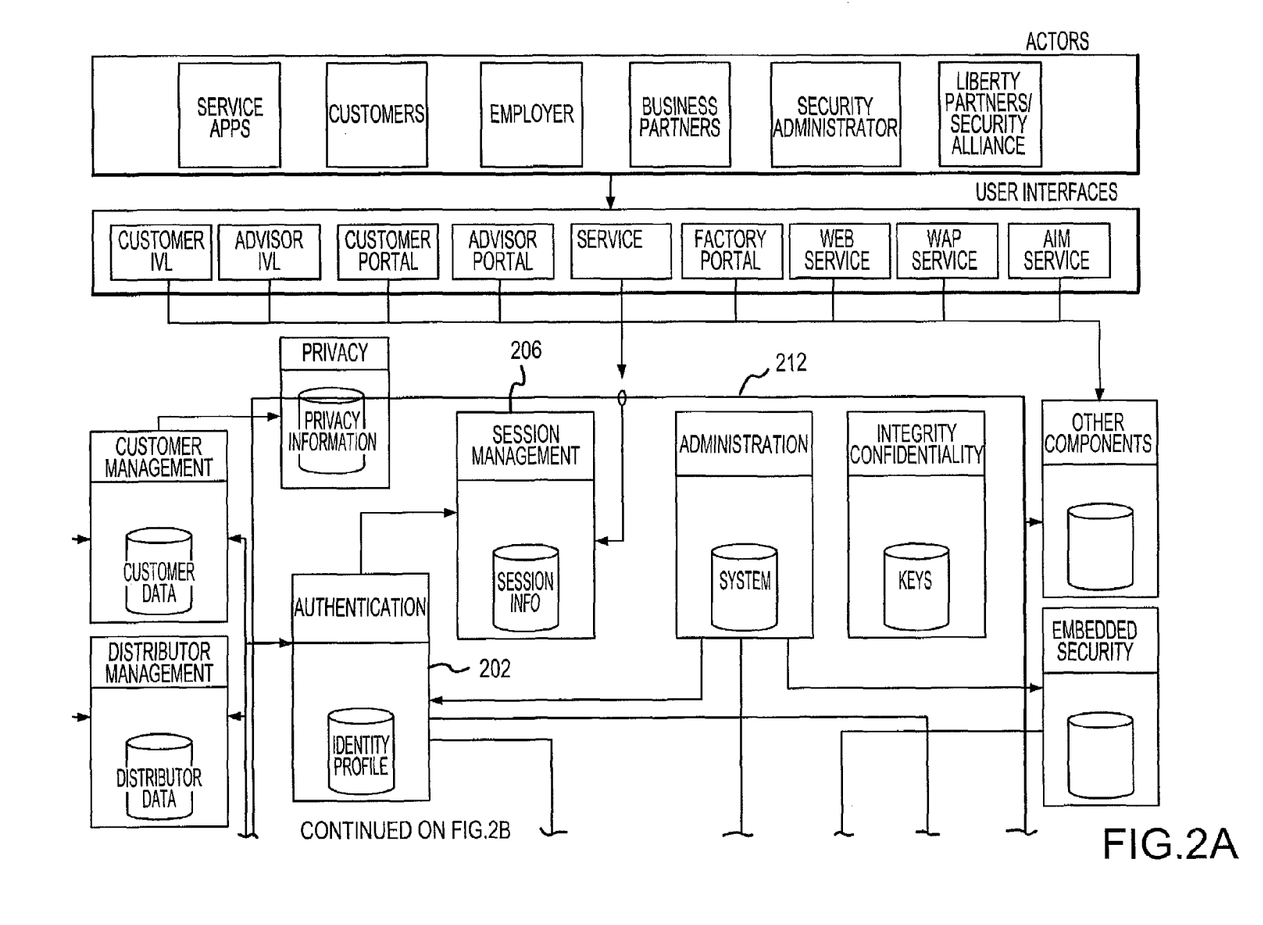
FIGS. 2A-2B are block diagrams illustrating a system of the present invention.
Figure 2B:
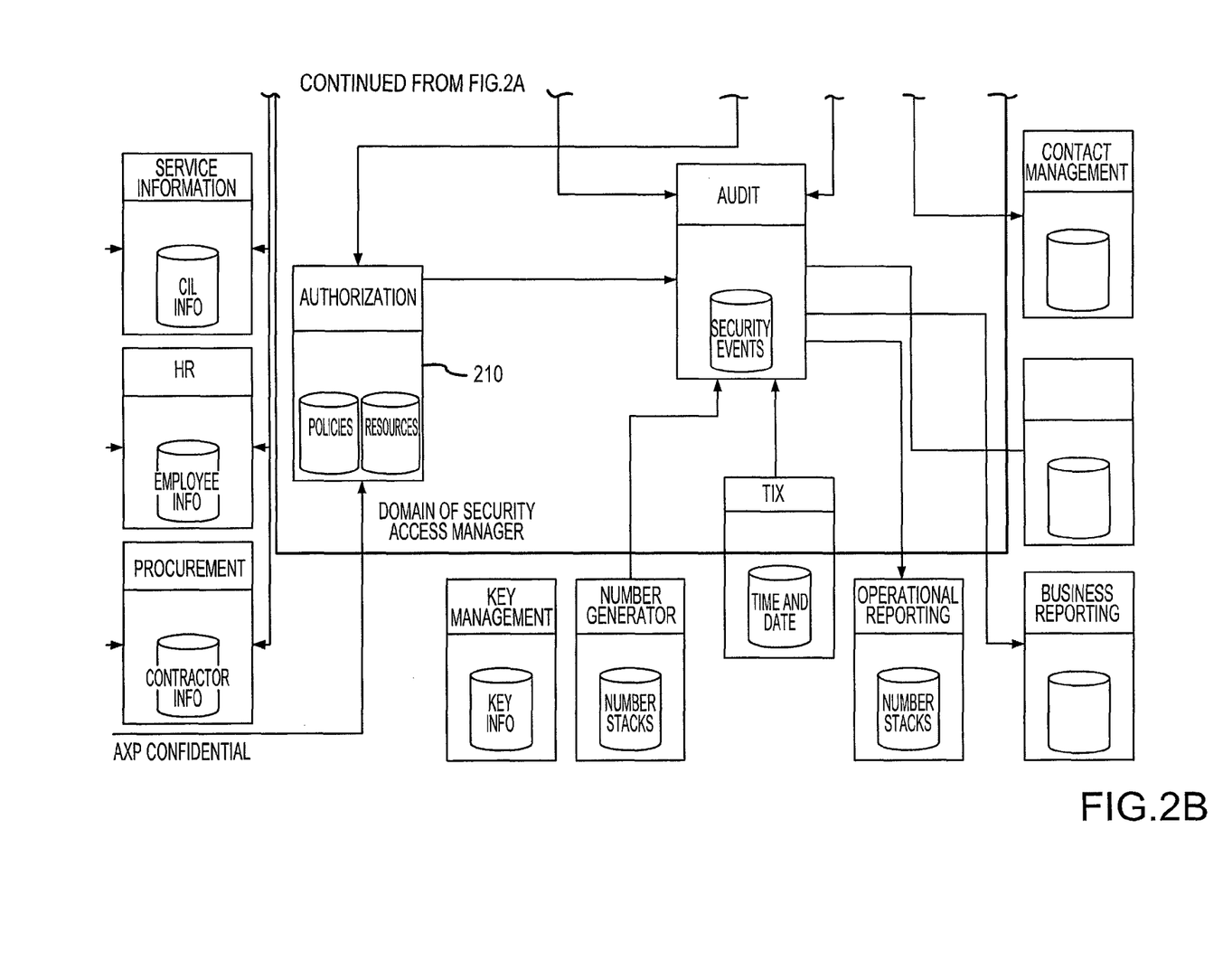

Module 202 contains the authentication service. The authentication service may be embodied as a software and/or hardware component that performs authentication of requests sent from other software systems. Each request may represent an attempt by a user or system to log onto some computer system. The protocol and interface may be of a variety of types, either standard, or proprietary. The authentication service may accept a set of user credentials such as a user ID and password, and return a security token associated with the supplied user credentials that may subsequently be used as described above.

In one embodiment, the authentication service uses Java Remote Method Invocation ("RMI"), with a proprietary Java function call that includes the above-mentioned parameters and return value. In another embodiment, the service uses HTTP and passes parameters and a return value in extensible Markup Language ("XML"), possibly in conformance with a standard such as Single Object Access Protocol ("SOAP") or the like.

An additional module is the authentication client. The authentication client may be a software component that may be used by a business application software component to fulfill the authentication and session management needs of the business application. In one embodiment, this authentication client module includes a Java package that allows the business application to invoke the appropriate Application Program Interfaces (APIs) for authentication and session management (module 206). The authentication client module is configured so that it may then invoke the corresponding interfaces for the authentication service (module 202) and session management (module 206), as described above. The authentication client may utilize standard or proprietary protocols, and may utilize a protocol that corresponds to that which is used by the authentication service.

The system may include a host server or other computing systems including a processor for processing digital data, a memory coupled to said processor for storing digital data, an input digitizer coupled to the processor for inputting digital data, an application program stored in said memory and accessible by said processor for directing processing of digital data by said processor, a display coupled to the processor and memory for displaying information derived from digital data processed by said processor and a plurality of databases, said databases including client data, merchant data, financial institution data and/or like data that could be used in association with the present invention. As those skilled in the art will appreciate, user computer will typically include an operating system (e.g., Windows NT, 95/98/2000, Linux, Solaris, etc.) as well as various conventional support software and drivers typically associated with computers. User computer can be in a home or business environment with access to a network. In an exemplary embodiment, access is through the Internet through a commercially-available web-browser software package.

The computer may provide a suitable website or other Internet-based graphical user interface which is accessible by users. In one embodiment, the Internet Information Server, Microsoft Transaction Server, and Microsoft SQL Server, are used in conjunction with the Microsoft operating system, Microsoft NT web server software, a Microsoft SQL database system, and a Microsoft Commerce Server. Additionally, components such as Access or SQL Server, Oracle, Sybase, Informix MySQL, Intervase, etc., may be used to provide an ADO-compliant database management system. The term "webpage" as it is used herein is not meant to limit the type of documents and applications that might be used to interact with the user. For example, a typical website might include, in addition to standard HTML documents, various forms, Java applets, Javascript, active server pages (ASP), common gateway interface scripts (CGI), extensible markup language (XML), dynamic HTML, cascading style sheets (CSS), helper applications, plug-ins, and the like.

Database may be any type of database, such as relational, hierarchical, object-oriented, and/or the like. Common database products that may be used to implement the databases include DB2 by IBM (White Plains, N.Y.), any of the database products available from Oracle Corporation (Redwood Shores, Calif.), Microsoft Access or MSSQL by Microsoft Corporation (Redmond, Wash.), or any other database product. Database may be organized in any suitable manner, including as data tables or lookup tables. Association of certain data may be accomplished through any data association technique known and practiced in the art. For example, the association may be accomplished either manually or automatically. Automatic association techniques may include, for example, a database search, a database merge, GREP, AGREP, SQL, and/or the like. The association step may be accomplished by a database merge function, for example, using a "key field" in each of the manufacturer and retailer data tables. A "key field" partitions the database according to the high-level class of objects defined by the key field. For example, a certain class may be designated as a key field in both the first data table and the second data table, and the two data tables may then be merged on the basis of the class data in the key field. In this embodiment, the data corresponding to the key field in each of the merged data tables is preferably the same. However, data tables having similar, though not identical, data in the key fields may also be merged by using AGREP, for example.

In operation, the processing of a request entails communication between the authentication client and the authentication service. All requests are forwarded directly to the authentication service, with parameters and return values being passed back and forth between the authentication service and the authentication client. In one embodiment, parameters and return values are exchanged in an unmodified form. In another embodiment, parameters and return values are modified, and/or include additional elements. In another embodiment, parameters and return values are encrypted with a proprietary or standard encryption protocol and algorithm, such as SSL, Triple DES, AES, or the like. Suitable key management and exchange capabilities may also be incorporated into the clients and server to support encryption and decryption.

In one exemplary embodiment, the business applications are web-based applications. In an exemplary embodiment, when a user attempts to log onto the business application, authentication credentials are passed to the authentication service. Typically, the business application will accept and forward a user ID and password to the authentication service. In the alternative, other forms of identifying the user, such as biometric credentials, may be used. The response from the authentication service may then include a session token if the authentication credentials were validated. This session token is received by the authentication client and presented back to the requesting business application. From that point on, the session token is validated with any or all requests that are received by the business application. After the user is authenticated (i.e., the user's identity is substantially confirmed), the user may be authorized by the appropriate authorization module (i.e., permitted to perform certain tasks on the business application). For example, if the business application is an on-line banking service, after the user is authenticated, the user may be authorized to perform certain tasks, such as view balances, but not authorized to perform other tasks, such as make transfers, due to the level of security provided in the authentication.

Processing of subsequent actions may entail any of a number of process steps. While an action may be handled by the business application without session validation, a more secure approach is to include session validation with the handling of each action. This may occur simply within the client module, which contains various logic and process steps to compare the newly presented session token to a session token that was previously issued to the user. In an exemplary embodiment, a call and response with an authentication server occurs. This authentication server may be either the same or different from the one that originally issued the session token. Session validation may reside in either the client authentication module or the session validator module.

In another embodiment, a hybrid security token supports facilitation of session management by representing the confirmed identities of either: a) both client and user or b) client, user, and server. In another embodiment, an N-way token is generated to establish communication from a client to server when the identity of N principals has been confirmed, possibly by cryptographic means, and transmits this confirmation of identity to the server, thus allowing the server to interact with the client with reasonable certainty that all principals are valid.

Additional processes for the above-described system and methods allow administrators to add, remove, and modify user, session, and authorization configurations so as to grant desired users access to desired functionality over desired sessions. An administrator module (212) may also be included in an exemplary embodiment to support these activities by directing the various business applications to the appropriate module.

In another embodiment, another module may be used to facilitate authorization as part of application security. In this context, application security pertains to a system that includes: 1) a user, possibly interacting by means of an HTTP browser; 2) a business application, possibly interacting with the user by means of an HTTP server and containing an authentication client; 3) an authentication server which interacts with: (a) an authentication client module and, optionally, (b) a session validator module contained in the business application; and/or 4) an application service, which contains an authorization client module which interacts with the authentication server.

Communication between the parties to the transaction and the system of the present invention is accomplished through any suitable communication means, such as, for example, a telephone network, Intranet, Internet, point of interaction device (point of sale device, personal digital assistant, cellular phone, kiosk, etc.), online communications, off-line communications, wireless communications, transponder communications and/or the like. One skilled in the art will also appreciate that, for security reasons, any databases, systems, or components of the present invention may consist of any combination of databases or components at a single location or at multiple locations, wherein each database or system includes any of various suitable security features, such as firewalls, access codes, encryption, de-encryption, compression, decompression, and/or the like.

Figure 3:
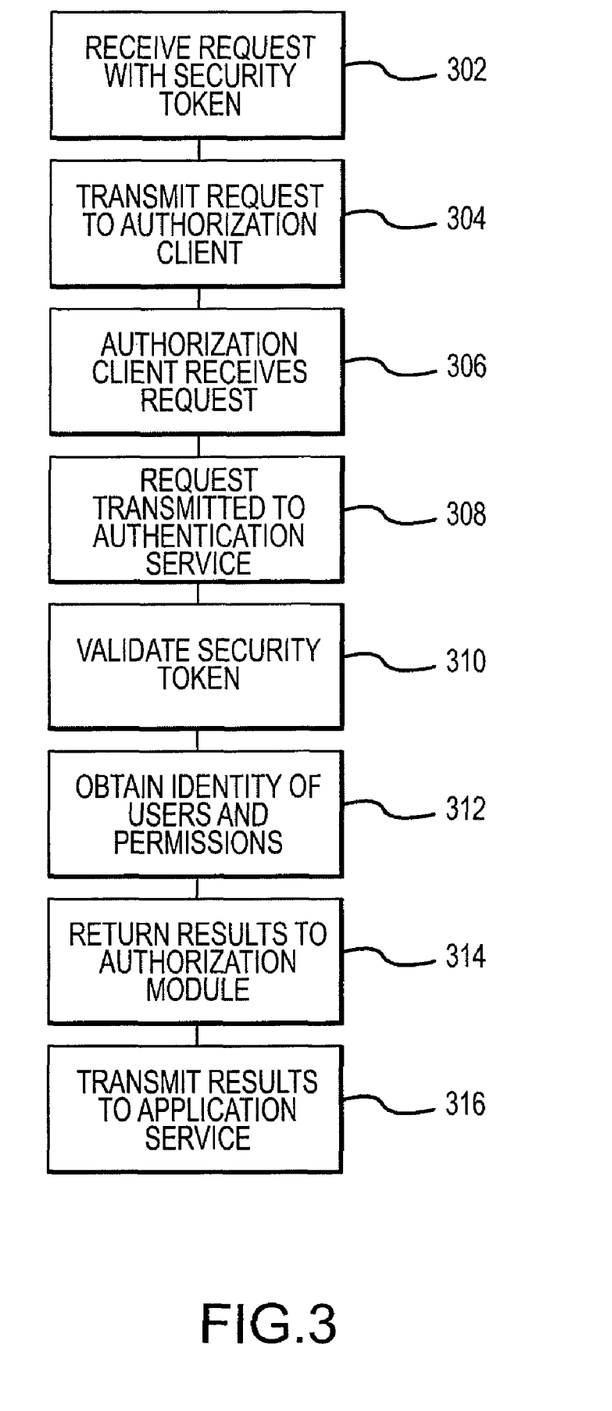
FIG. 3 is a flow chart illustrating the process of authenticating a user under an embodiment of the present invention.

An exemplary use of an authorization client module is described with respect to FIG. 3. When a request is received by the application service (step 302), this request contains a security token, which the application service passes to the authorization client along with information pertaining to the nature of the request (step 304). This information may simply identify the application service itself, or may further describe the nature of the request submitted to it. For example, a request to a funds transfer application service may simply identify the fact that the request was made to the funds transfer service (presumably identifying a request to transfer funds) or may further identify the related accounts for which funds transfer is requested and which may also include supplemental information, (e.g., transfer amounts.) In one embodiment, the request to the authorization module does not seek transactional completion, it merely seeks to determine whether the underlying transaction may be attempted by the user.

Once the authorization client module receives the request (step 306), it formulates a request that is transmitted to the authentication service through an appropriate interface (step 308). This request contains all or most of the information of the request that originated from the application service, and includes the security token from the user and at least one additional piece of information, as mentioned above. After being received by the authentication service, the security token is validated (step 310), and the identity of the user is extracted so that the permissions of the user may be obtained from the appropriate database (step 312). Permissions may be stored in ACLs, and describe requests for which permission will be granted by virtue of the authorization capabilities of the authentication server. A combination of lookup, optional access of other back-end systems, computational algorithms, or other means may be used to determine whether the request is to be granted. The identity of the user may be treated as an individual or group, and any of a number of permission granting schemes may be used, for example, those supported by typical operating systems and programming libraries including but not limited to UNIX, Windows, Java, etc. Once the process step of determining permissions finishes, the result is formatted and returned to the authorization module (step 314). Thereafter, the result is transmitted to the original application service (step 316). In one embodiment of the application service, denial of permission results in no attempt to perform the requested action and granting of permission results in an attempt to perform the action requested by the user.

The present invention is described herein with reference to block diagrams, flowchart illustrations of methods, systems, and computer program products according to various aspects of the invention. It will be understood that each functional block of the block diagrams and the flowchart illustrations, and combinations of functional blocks in block diagrams and flowchart illustrations, respectively, may be implemented by computer program instructions. These computer program instructions may be loaded on a general purpose computer, special purpose computer, or other programmable data processing apparatus to produce a machine, such that the instructions which execute on the computer or other programmable data processing apparatus create means for implementing the functions specified in the flowchart block or blocks.

These computer program instructions may also be stored in a computer-readable memory that may direct a computer or other programmable data processing apparatus to function in a particular manner, such that the instructions stored in the computer-readable memory produce an article of manufacture including instruction means which implement the function specified in the flowchart block or blocks. The computer program instructions may also be loaded on a computer or other programmable data processing apparatus to cause a series of operational steps to be performed on the computer or other programmable apparatus to produce a computer-implemented process such that the instructions which execute on the computer or other programmable apparatus provide steps for implementing the functions specified in the flowchart block or blocks.

Accordingly, functional blocks of the block diagrams and flowchart illustrations support combinations of means for performing the specified functions, combinations of steps for performing the specified functions, and program instruction means for performing the specified functions. It will also be understood that each functional block of the block diagrams and flowchart illustrations, and combinations of functional blocks in the block diagrams and flowchart illustrations, may be implemented by either special purpose hardware-based computer systems which perform the specified functions or steps, or suitable combinations of special purpose hardware and computer instructions.

It will be appreciated, that many applications of the present invention could be formulated. One skilled in the art will appreciate that the network may include any system for exchanging data or transacting business, such as the Internet, an intranet, an extranet, WAN, LAN, satellite communications, and/or the like. It is noted that the network may be implemented as other types of networks, such as an interactive television (ITV) network. The users may interact with the system via any input device such as a keyboard, mouse, kiosk, personal digital assistant, handheld computer (e.g., Palm Pilot®, cellular phone and/or the like. Similarly, the invention could be used in conjunction with any type of personal computer, network computer, workstation, minicomputer, mainframe, or the like running any operating system such as any version of Windows, Windows NT, Windows2000, Windows 98, Windows 95, MacOS, OS/2, BeOS, Linux, UNIX, Solaris or the like. Moreover, although the invention is frequently described herein as being implemented with TCP/IP communications protocols, it will be readily understood that the invention could also be implemented using IPX, Appletalk, IP-6, NetBIOS, OSI or any number of existing or future protocols. Moreover, the system contemplates the use, sale or distribution of any goods, services or information over any network having similar functionality described herein.

The computing units may be connected with each other via a data communication network. The network may be a public network and assumed to be insecure and open to eavesdroppers. In the illustrated implementation, the network may be embodied as the internet. In this context, the computers may or may not be connected to the internet at all times. For instance, the customer computer may employ a modem to occasionally connect to the internet, whereas the bank computing center might maintain a permanent connection to the internet. Specific information related to the protocols, standards, and application software utilized in connection with the Internet may not be discussed herein. For further information regarding such details, see, for example, DILIP NAIK, INTERNET STANDARDS AND PROTOCOLS (1998); JAVA 2 COMPLETE, various authors, (Sybex 1999); DEBORAH RAY AND ERIC RAY, MASTERING HTML 4.0 (1997). LOSHIN, TCP/IP CLEARLY EXPLAINED (1997). All of these texts are hereby incorporated by reference.

As will be appreciated by one of ordinary skill in the art, the present invention may be embodied as a method, a data processing system, a device for data processing, and/or a computer program product. Accordingly, the present invention may take the form of an entirely software embodiment, an entirely hardware embodiment, or an embodiment combining aspects of both software and hardware. Furthermore, the present invention may take the form of a computer program product on a computer-readable storage medium having computer-readable program code means embodied in the storage medium. Any suitable computer-readable storage medium may be utilized, including hard disks, CD-ROM, optical storage devices, magnetic storage devices, and/or the like.

In the foregoing specification, the invention has been described with reference to specific embodiments. However, it will be appreciated that various modifications and changes may be made without departing from the scope of the present invention. The specification and figures are to be regarded in an illustrative manner, rather than a restrictive one, and all such modifications are intended to be included within the scope of present invention.

Benefits, other advantages, and solutions to problems have been described above with regard to specific embodiments. No element described herein is required for the practice of the invention unless expressly described as "essential" or "critical."

We claim:

1. A method comprising:

receiving, by a computer for providing security to a networked computing system, authentication credentials from an authentication client, wherein said authentication credentials are provided in response to a first request from a client and, wherein, based upon said first request, said authentication client invokes an Application Programming Interface (API) corresponding to a request type, associated with said first request, causing a corresponding interface to be displayed at a business application of said client, and wherein said interface facilitates collection of said authentication credentials;

validating, by said computer, said authentication credentials received from said business application via said authentication client;

determining, by said computer and based upon stored user data, a manner by which said client was validated and access type information identifying characteristics of said first request; and issuing, by said computer and in response to said determining, a session token to said client, wherein said session token includes data indicating said manner by which said client was validated and said access type information identifying characteristics of said first request, generating, by said computer, said session token by:
 generating random data based on said authentication credentials;
 retrieving a timestamp;
 creating an incremental token identifier;
 concatenating said random data, said timestamp, and said incremental token identifier to create a Binary Large Object (BLOB); and,
 applying an encryption algorithm with a fixed key to said BLOB to create said session token;

wherein a separate computer for providing security compares said session token to a previous session token issued to said client.

2. The method of claim 1, further comprising generating said session token.

3. The method of claim 1, wherein said fixed key is at least one of: Data Encryption Standard (DES), triple DES, or Advanced Encryption Standard (AES).

4. The method of claim 1, wherein said session token is encrypted using at least one of a standard encryption protocol, a proprietary encryption protocol, or an algorithm.

5. The method of claim 1, wherein said session token comprises at least one of random data, data indicative of a time of creation of said session token, or data indicative of a number of said session tokens previously created.

6. The method of claim 1, wherein said session token facilitates session management based on confirmed identities of said client, a user and a server.

7. The method of claim 1, further comprising receiving a second request from said client, wherein said second request includes said session token, and validating said session token.

8. The method of claim 1, further comprising retrieving from stored user data, using said session token, user permissions corresponding to said session token.

9. The method of claim 1, further comprising retrieving from stored user data using said session token, user permissions corresponding to said session token, wherein said stored user data includes information regarding previous access attempts by a user.

10. The method of claim 1, further comprising comparing said first request to user permissions, evaluating authentication level information, and evaluating said access type information to determine that a second request is permissible.

11. The method of claim 10, further comprising transmitting a response to an application service indicative of said second request being permissible.

12. The method of claim 1, wherein said validating step is performed by an authorization component.

13. The method of claim 1, wherein said authentication credentials comprise at least one of textual input and biometric data.

14. The method of claim 1, further comprising retrieving from stored user data, using said session token, user permissions corresponding to said session token, wherein said stored user data further comprises at least one of an expiration time, host identifier, security realm, public globally unique identifier (GUID), private GUID, electronic signature, process identifier, parent process identifier, token type, version, or maximum inactivity time.

15. The method of claim 1, further comprising retrieving from stored user data, using said session token, user permissions corresponding to said session token, wherein said stored user data further comprises at least one of a most recent session access, a copy of user profile data, current status of a user, expiration time of session, host information where said user logged in, security characteristics of a session, a globally unique identifier, electronic signature, process identifier, parent process identifier, token type, token version, or maximum inactivity time allowed.

16. A method comprising:
receiving, by an authentication client, a first request from a client;
selecting, by said authentication client, an Application Programming Interface (API) corresponding to a request type associated with said first request;
invoking, by said authentication client, said API causing an interface corresponding to said API to be displayed at a business application of said client;
receiving, by said authentication client, authentication credentials from said client, wherein said authentication credentials are retrieved in accordance with said interface; and
transmitting, by said authentication client, said authentication credentials to an authentication service, wherein said authentication service validates said authentication credentials and, in response to said validating said authentication credentials, issues a session token to said client, wherein said session token includes data indicating a manner by which said client was validated and access type information identifying characteristics of said first request, wherein a separate authentication client compares said session token to a previous session token issued to said client, wherein said authentication service generates said session token by generating random data based on said authentication credentials, retrieves a timestamp, creates an incremental token identifier, concatenates said random data, said timestamp, and said incremental token identifier to create a Binary Large Object (BLOB), and applies an encryption algorithm with a fixed key to said BLOB to create said session token.

17. A method comprising:
sending, by a client system, a first request from a client to an authentication client, wherein said authentication client selects an Application Programming Interface (API) corresponding to a request type associated with said first request, and invokes said API causing an interface corresponding to said API to be displayed at a business application of said client;
displaying, by said client, said interface;
receiving, by said client, authentication credentials via said interface;
generating, by said client, a session token by generating random data based on said authentication credentials, retrieving a timestamp, creating an incremental token identifier, concatenating said random data, said timestamp, and said incremental token identifier to create a Binary Large Object (BLOB); and, applying an encryption algorithm with a fixed key to said BLOB to create said session token; and
sending said authentication credentials from said client to said authentication client, wherein said authentication credentials are retrieved by said authentication client in accordance with said interface and said authentication credentials are transmitted by said authentication client to an authentication service, and wherein said authentication service validates said authentication credentials and, in response to said validating said authentication credentials, issues said session token to said client, wherein said session token includes data indicating a manner by which said client was validated and access type information identifying characteristics of said first request, and wherein a separate authentication client compares said session token to a previous session token issued to said client.

* * * * *